No. 658,410. Patented Sept. 25, 1900.
G. W. TERRY.
VEHICLE AXLE NUT.
(Application filed Mar. 12, 1900.)
(No Model.)
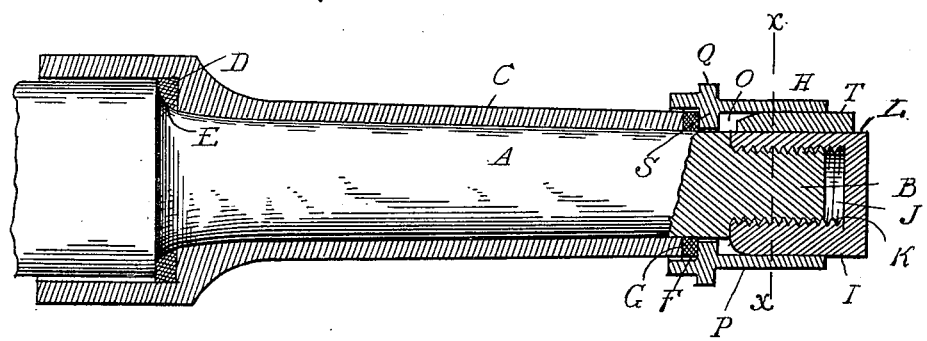
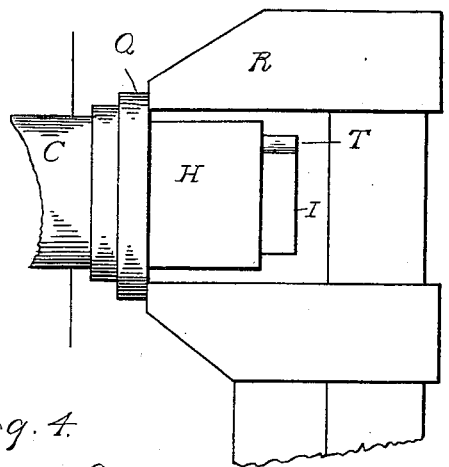
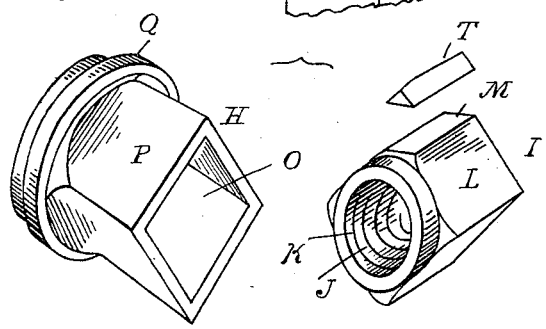
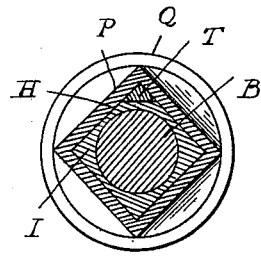
Witnesses
H. C. Smith
M. B. Dougherty
Inventor
George W. Terry
By  Attys.

UNITED STATES PATENT OFFICE.

GEORGE W. TERRY, OF PONTIAC, MICHIGAN, ASSIGNOR OF ONE-HALF TO ISAAC E. TERRY, OF SAME PLACE.

VEHICLE-AXLE NUT.

SPECIFICATION forming part of Letters Patent No. 658,410, dated September 25, 1900.

Application filed March 12, 1900. Serial No. 8,390. (No model.)

*To all whom it may concern:*

Be it known that I, GEORGE W. TERRY, a citizen of the United States, residing at Pontiac, in the county of Oakland and State of Michigan, have invented certain new and useful Improvements in Vehicle-Axle Nuts, of which the following is a specification, reference being had therein to the accompanying drawings.

The invention has reference generally to axle-nuts for vehicles, and relates particularly to the extensible type of nut formed in two sections to permit of the nut being lengthened when desired to take up the end play of the parts.

The principal object of my invention is to produce an axle-nut of the type referred to that may be adjusted or extended for the purposes set forth while upon the spindle end, whereby the exact adjustment required may be made, being rapidly effected in a minimum space of time.

A further object of the invention is to provide means for locking the extensible member to and at any point upon its complementary member, whereby its exact adjustment when effected may be maintained and the end play of the parts be completely taken up; and a still further object of the invention is to construct the axle-nut in such manner that it will be simple in construction and capable of being readily applied to any vehicle.

With these objects in view my invention consists in a novel construction of the axle-nut and in the peculiar formation, arrangement, and combination of the various parts thereof, as will be more fully hereinafter described and shown.

In the drawings, Figure 1 is a vertical longitudinal section through an axle-box and spindle and the extensible nut, showing the formation of the latter. Fig. 2 is a view in elevation of the nut as applied to a vehicle, showing means for adjusting the same. Fig. 3 is a cross-section taken on line $x\,x$, Fig. 1; and Fig. 4 is a perspective view of the parts of the vehicle-nut detached.

The reference-letter A designates a spindle of usual construction terminating at its free end in the usual threaded nipple B, and C is the axle-box within which the spindle turns. D designates a washer arranged intermediate the box and spindle-shoulder E, and F is a similar washer bearing against the outer end G of the axle-box.

In construction the axle-nut is formed in two sections or members H and I, the latter or inner member being recessed to form a socket, such as J, and internally screw-threaded, as at K, to permit of its engagement with the nipple B. This member has a polygonal surface L formed upon its exterior, as plainly shown in Fig. 4, and one corner thereof is beveled, as at M, for the purpose hereinafter set forth. The outer or what I term the "extensible" member H of the nut has a polygonal opening O formed therein, conforming in configuration to the surface L, and is preferably provided with a wrench-hold P upon its exterior and with an annular flange Q, which serves as a dust-guard and also as a bearing-surface against which an adjusting device, such as the wrench R, (shown in Fig. 2,) may bear. The member H is also provided with a depending annular flange S, which bears in the usual manner against the washer G, as shown in Fig. 1.

T represents the locking device, which in this particular case is in the form of a wedge, as plainly shown in Fig. 4, the latter being triangular in form. One surface of the wedge is adapted to bear against the bevel portion M of the member L and engage between said surface and a corresponding corner of the polygonal opening O, as plainly illustrated in Fig. 3.

In assembling the parts the extensible member is placed upon the spindle end and the inner member I of the nut is threaded upon the nipple B, said member extending within the extensible member, as shown. The parts are then locked by means of the wedge. To effect the adjustment, the nut members having a sliding engagement one with another, as shown, the operator drives the extensible member inwardly the desired amount, which movement is not in any way retarded by the wedge, and after the adjustment is effected the wedge is driven and locks the members together.

The advantages of this construction of nut will be readily apparent when it is taken into consideration that the nut as an entirety is always upon the spindle end, and the necessity of removing the same from the threaded nipple for the purpose of making temporary adjustment is dispensed with; also, for this reason a perfect adjustment can be made in minimum space of time, as when the extensible member is driven inwardly as far as possible the end play of the parts is taken up and the adjustment is at once made. By employing the locking device described it is possible to lock the extensible member at any point that may be desired along its complementary member, so that after the adjustment has been effected the extensible member is locked in its adjusted position.

I have shown the extensible member of the nut as provided with a wrench-hold to permit of the nut being turned. This, however, is not an essential construction, as the turning could be effected, if desired, by applying the wrench to the end of the inner member. I therefore do not desire to limit myself to the exact formation, as it is possible for various modifications to be made and different forms of nut members used without in any manner departing from the spirit of my invention.

What I claim as my invention is—

An extensible axle-nut comprising two telescoping members or sections, the inner member being recessed and threaded internally and having a polygonal outer surface, and an outer or extensible member having an opening formed therein conforming in configuration to said polygonal surface and provided upon its exterior with a wrench-hold, and a locking-wedge extending lengthwise of the nut and between the members, substantially as described.

In testimony whereof I affix my signature in presence of two witnesses.

GEORGE W. TERRY.

Witnesses:
M. B. O'DOGHERTY,
H. C. SMITH.